D. ROSSI.
METHOD OF AND APPARATUS FOR MAKING ARTIFICIAL BARK.
APPLICATION FILED AUG. 5, 1920.
1,407,950.
Patented Feb. 28, 1922.
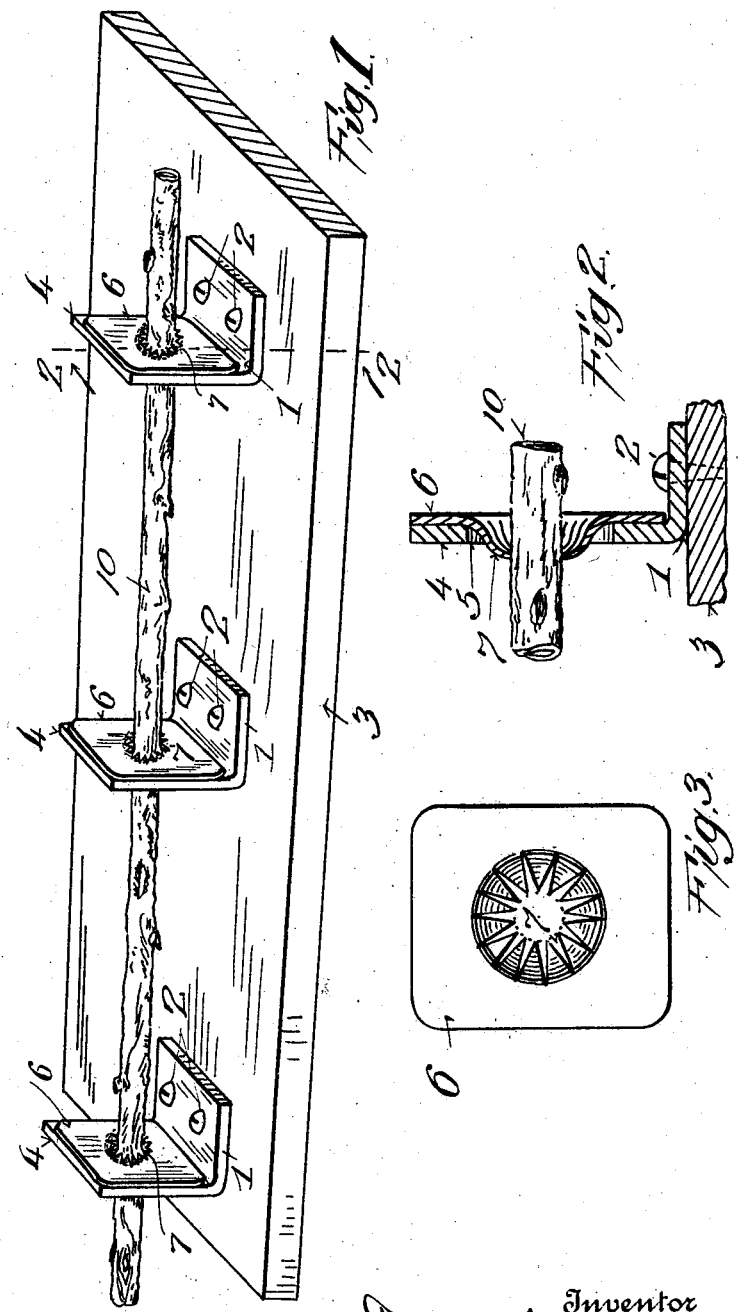

UNITED STATES PATENT OFFICE.

DOMINICK ROSSI, OF NEW YORK, N. Y.

METHOD OF AND APPARATUS FOR MAKING ARTIFICIAL BARK.

1,407,950.  Specification of Letters Patent.  Patented Feb. 28, 1922.

Application filed August 5, 1920. Serial No. 401,548.

*To all whom it may concern:*

Be it known that I, DOMINICK ROSSI, a citizen of the United States, residing at New York, in the county and State of New York, have made a certain new and useful Invention in Method of and Apparatus for Making Artificial Bark, of which the following is a specification.

This invention relates to the method of and apparatus for making artificial bark, twigs or stems of plants or the like.

The object of my invention is to provide novel apparatus for and method of producing the artificial product which is soft and pliable, extremely elastic, and which is not soluble in hot or cold water or other moisture, and which may be extensively used therefore for decorative purposes in connection, for example, with hats, exterior scenes, etc.

Further objects of the invention will appear more fully hereinafter.

The invention consists substantially in the construction, combination, location and relative arrangement of parts, all as will be more fully hereinafter set forth, as shown by the accompanying drawing, and finally pointed out in the appended claims.

Referring to the drawings:—

Fig. 1 is a view in perspective showing apparatus embodying my invention and the method employed in connection therewith for the production of the artificial stems, bark, etc.

Fig. 2 is a sectional view taken on the line 2—2 of Fig. 1 and looking in the direction of the arrows.

Fig. 3 is a view in front elevation of the device embodying my invention for producing the artificial bark, stem, etc. effect.

The same part is designated by the same reference character wherever it occurs throughout the several views.

It is the purpose of my present invention to make an artificial twig, stem, bark, and a flower or other plant of soft, pliable, elastic material of the general nature and for the purpose more fully set forth in my U. S. Patent #1,204,905, patented November 14, 1916. In my above identified patent I have shown and described a method of producing artificial flower stems and a method of and means for specifically producing artificial thorns on such artificial stems. My present invention as distinguished therefrom is to produce artificially upon such artificial stems the natural appearance of roughness incident to stems, twigs, etc., containing roughened bark or outer skin, and to simulate on the artificial stem such natural roughened condition. As in the case of my issued patent, in carrying out my invention I provide a solution composition of gelatine, glycerine, and suitable coloring matter, and keep the solution in a plastic state by supplying a sufficient amount of heat thereto. In the present case, however, I use a tubular fabric of indefinite length, the diameter of which is controlled in accordance with the size of the twig, stem, or the like desired to be produced. The fabric is passed through the above solution whereby the fabric becomes saturated and the gelatinous solution adheres to the exterior surface thereof. In practice it is the custom to feed the tubular fabric from the machines for producing the same in an endless length directly through the gelatinous bath. Machines for producing the tubular fabric are well known in the art and form no part of my present invention. In accordance with my present invention, however, I pass the tubular fabric with its coating of gelatinous matter while still in a soft plastic condition through one or more devices illustrated in Fig. 3, which I will term scrapers. The scrapers are relatively cooler than the gelatine adhering to the tubular fabric whereby when passing through each of the scrapers the treated fabric is cooled to a slight degree and, in consequence, each scraper will have a different effect upon the gelatinous adhesion to the tubular fabric, with the result that when the fabric and its gelatinous adhesion has become completely cooled after passing through the scraper a roughened irregular surface for the treated tubular fabric is obtained. It will be apparent that as many scrapers may be utilized as desired, each preferably but not necessarily maintained cool relative to the gelatinous adhesion to the fabric and as each scraper operates on the fabric when the gelatinous adhesion thereto is at a different temperature, each scraper will have a different effect thereon so that by controlling the degree of heat of the various scrapers or the distance apart thereof, or the number thereof employed or in combination with the same, it is possible to obtain practically any desired simulation of natural plant stem, twig, bark, etc., formation common in the botanical art adopted for simulation for decorative purposes.

Referring to the drawing, I show in Fig. 1 angle plates 1 secured in any suitable manner, for example, by means of screws 2, to a suitable support which may be a table or the like, illustrated at 3. The angle plates are placed preferably, though not necessarily, parallel relative to each other, and as above stated, as many of them may be employed as desired, positioned as far apart from each other as desired. Each of the vertical portions 4 of the angle plates has an orifice therethrough, indicated at 5, so that the orifices of the various plates are preferably, though not necessarily, in alignment with each other. The scraping device illustrated in Fig. 3 consists of a plate 6, the central portion of which is stamped or otherwise suitably displaced to form a plurality of cutting teeth 7 in the displaced portion thereof. The scrapers 6 are positioned on the vertical portions 4 of the angle plates 1 with the depressed or teeth portion 7 thereof projecting through the orifice 5 of each of the angle plates. The tubular fabric 10 with its gelatinous adhesion is then passed by hand or otherwise through the scraping plate 6 and the orifice 5 in each of the angle plates employed and is drawn or otherwise suitably passed through the series of plates, if more than one be used, in any suitable manner to produce the result above outlined. It is apparent that the length of the teeth of the scraper 6 may be controlled at will by further pressing out the depressed portion of the plate or by forcing the same towards the common center of the respective teeth.

Having now set forth the objects and nature of my invention, and having set forth the method of operation contemplated thereby, together with apparatus for use in connection therewith, what I claim as new and useful, and of my own invention, and desire to secure by Letters Patent is:—

1. The method of producing artificial stems, twigs or the like which comprises coating a substantially circular body with a gelatinous material under heat simulating in color the article to be imitated, then cutting into the gelatinous material longitudinally relative to the body.

2. The method of producing artificial stems, twigs or the like which comprises coating a substantially circular body with a gelatinous material under heat simulating in color the article to be imitated, then cutting into the gelatinous material longitudinally relative to the body, at intervals during the cooling thereof.

3. The method of producing artificial stems, twigs or the like which comprises coating a substantially circular body with a gelatinous material under heat simulating in color the article to be imitated, then marring or cutting into the gelatinous material longitudinally relative to the body at a plurality of points around the periphery of the body.

4. The method of producing artificial stems, twigs or the like which comprises coating a substantially circular body with a gelatinous material under heat simulating in color the article to be imitated, then marring or cutting into the gelatinous material longitudinally relative to the body at a plurality of points around the periphery of the body at intervals during the cooling thereof.

5. A tool for marring or cutting the periphery of a coated body to simulate a twig, stem, or the like, comprising a member provided with a central opening therethrough having a plurality of radially extending centrally projecting teeth.

6. A device for producing artificial stems, twigs or the like, which comprises a plurality of spaced tools, positioned in substantial alignment with each other, and each of said devices being provided with means for scraping or marring the periphery of the material operated on thereby in lines substantially parallel to the axis thereof.

7. A device for producing artificial stems, twigs or the like, which comprises a plurality of spaced tools, positioned in substantial alignment with each other, and each of said devices being provided with a central opening therethrough having a plurality of radially extending centrally projecting teeth.

In testimony whereof I have hereunto set my hand on this 31st day of July A. D. 1920.

DOMINICK ROSSI.